US011863549B2

(12) United States Patent
Zacks et al.

(10) Patent No.: US 11,863,549 B2
(45) Date of Patent: Jan. 2, 2024

(54) ADJUSTING SECURITY POLICIES BASED ON ENDPOINT LOCATIONS

(71) Applicant: Cisco Technology, Inc., San Jose, CA (US)

(72) Inventors: David J Zacks, Vancouver (CA); Carlos M. Pignataro, Cary, NC (US); Thomas Szigeti, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 17/178,199

(22) Filed: Feb. 17, 2021

(65) Prior Publication Data

US 2022/0255922 A1  Aug. 11, 2022

Related U.S. Application Data

(60) Provisional application No. 63/147,178, filed on Feb. 8, 2021.

(51) Int. Cl.
*H04L 9/40*  (2022.01)
*H04L 67/52*  (2022.01)
*G06Q 30/018*  (2023.01)

(52) U.S. Cl.
CPC ...... *H04L 63/0853* (2013.01); *H04L 63/0263* (2013.01); *H04L 63/0876* (2013.01);
(Continued)

(58) Field of Classification Search
CPC . H04L 63/0853; H04L 67/52; H04L 63/0263; H04L 63/0876; H04L 2463/082;
(Continued)

(56) References Cited

U.S. PATENT DOCUMENTS 5,771,291 A   6/1998  Newton
8,584,219 B1  11/2013  Toole et al.
(Continued)

OTHER PUBLICATIONS

Office Action for U.S. Appl. No. 17/178,234, dated Oct. 14, 2022, Zacks, "Enhanced Multi-Factor Authentication Based on Physical and Logical Proximity to Trusted Devices and Users", 26 pages.
(Continued)

*Primary Examiner* — Daniel B Potratz
*Assistant Examiner* — Arif Khan
(74) *Attorney, Agent, or Firm* — Lee & Hayes, P.C.

(57) ABSTRACT

This disclosure describes techniques for setting and/or adjusting a security policy associated with a device based on the physical locations of endpoint devices exchanging data with the device. An example method includes performing, at a first time, a first authentication of a first device connecting to a service; determining addresses of second devices exchanging data with the first device; determining physical locations of the second devices based on the addresses; and defining a reauthentication interval based on the physical locations of the second devices. At a second time that is after the first time by the reauthentication interval, the example method further includes disconnecting the first device from the service; and based on disconnecting the first device from the service, triggering a second authentication of the first device.

20 Claims, 6 Drawing Sheets

(52) U.S. Cl.
CPC ........... *H04L 67/52* (2022.05); *G06Q 30/018* (2013.01); *H04L 2463/082* (2013.01)

(58) Field of Classification Search
CPC ......... H04L 9/3234; H04L 9/32; H04L 63/02; H04L 63/029; H04L 63/0209; G06Q 30/018; H04W 12/60; H04W 12/63; H04W 12/64
See application file for complete search history.

(56) References Cited

U.S. PATENT DOCUMENTS

| | | |
|---|---|---|
| 8,793,774 B1 | 7/2014 | Kumar et al. |
| 8,929,257 B1 | 1/2015 | Goepp et al. |
| 9,177,123 B1 | 11/2015 | Farquhar |
| 9,268,920 B1 | 2/2016 | Butler et al. |
| 9,270,649 B1 | 2/2016 | Ng |
| 9,282,130 B1 | 3/2016 | Goepp et al. |
| 9,294,502 B1 | 3/2016 | Benishti |
| 9,398,007 B1* | 7/2016 | Wegener ............ H04W 12/33 |
| 9,641,526 B1* | 5/2017 | Gopalakrishnan .......................... H04L 63/0876 |
| 10,009,316 B1 | 6/2018 | Shavell et al. |
| 10,212,591 B1 | 2/2019 | Queru |
| 10,320,569 B1 | 6/2019 | Wentz et al. |
| 10,321,316 B1 | 6/2019 | Belton, Jr. et al. |
| 10,492,071 B1 | 11/2019 | Havaralu Rama Chandra Adiga et al. |
| 11,012,400 B1 | 5/2021 | Xu et al. |
| 2003/0152235 A1 | 8/2003 | Cohen et al. |
| 2004/0034771 A1 | 2/2004 | Edgett et al. |
| 2004/0215980 A1 | 10/2004 | Hamid |
| 2006/0089125 A1 | 4/2006 | Frank |
| 2007/0050632 A1 | 3/2007 | Matsuoka et al. |
| 2007/0083771 A1 | 4/2007 | Chen |
| 2008/0092214 A1 | 4/2008 | Zavalkovsky et al. |
| 2010/0011427 A1 | 1/2010 | Zayas |
| 2010/0167692 A1 | 7/2010 | Haynes et al. |
| 2011/0222465 A1 | 9/2011 | Arashin et al. |
| 2012/0233674 A1 | 9/2012 | Gladstone et al. |
| 2013/0167211 A1 | 6/2013 | Kamat |
| 2013/0179966 A1 | 7/2013 | Sawamura |
| 2013/0191903 A1 | 7/2013 | Jaudon et al. |
| 2014/0093072 A1 | 4/2014 | Biradar et al. |
| 2014/0282868 A1 | 9/2014 | Sheller et al. |
| 2014/0376029 A1 | 12/2014 | Itoh |
| 2015/0128240 A1 | 5/2015 | Richards et al. |
| 2015/0195334 A1 | 7/2015 | Chew |
| 2015/0195394 A1 | 7/2015 | Bietz et al. |
| 2015/0229650 A1 | 8/2015 | Grigg et al. |
| 2016/0132670 A1 | 5/2016 | Salama et al. |
| 2016/0165036 A1 | 6/2016 | Leow |
| 2016/0242033 A1 | 8/2016 | Jung et al. |
| 2016/0344747 A1 | 11/2016 | Link, II |
| 2016/0359838 A1 | 12/2016 | Dasgupta et al. |
| 2016/0364610 A1 | 12/2016 | Jung et al. |
| 2017/0063852 A1 | 3/2017 | Azar et al. |
| 2017/0094517 A1 | 3/2017 | Jakobsson |
| 2017/0126660 A1 | 5/2017 | Brannon |
| 2017/0140139 A1 | 5/2017 | Heath et al. |
| 2017/0142589 A1 | 5/2017 | Park et al. |
| 2017/0344745 A1 | 11/2017 | Wadley et al. |
| 2018/0033089 A1 | 2/2018 | Goldman et al. |
| 2018/0076964 A1 | 3/2018 | Bryan et al. |
| 2018/0091493 A1 | 3/2018 | Raounak |
| 2018/0101678 A1 | 4/2018 | Rosa |
| 2018/0131686 A1* | 5/2018 | Brannon ............. H04L 63/0815 |
| 2018/0248863 A1 | 8/2018 | Kao et al. |
| 2018/0248892 A1 | 8/2018 | Hefetz |
| 2018/0341758 A1 | 11/2018 | Park et al. |
| 2018/0351944 A1 | 12/2018 | Cho et al. |
| 2018/0359221 A1 | 12/2018 | Dorfman |
| 2019/0026501 A1 | 1/2019 | Martel et al. |
| 2019/0044942 A1 | 2/2019 | Gordon et al. |
| 2019/0116179 A1 | 4/2019 | Xu |
| 2019/0121961 A1 | 4/2019 | Coleman et al. |
| 2019/0121962 A1* | 4/2019 | Coleman .............. H04L 63/083 |
| 2019/0364034 A1* | 11/2019 | Alexander .............. H04L 63/12 |
| 2020/0013051 A1* | 1/2020 | Kadiwala .............. H04L 63/068 |
| 2020/0026830 A1 | 1/2020 | Alameh et al. |
| 2020/0045055 A1 | 2/2020 | DiAcetis et al. |
| 2020/0053083 A1 | 2/2020 | Kunz et al. |
| 2020/0137056 A1 | 4/2020 | Havaralu Rama Chandra Adiga et al. |
| 2020/0177602 A1 | 6/2020 | Koyun et al. |
| 2020/0280616 A1 | 9/2020 | Sim et al. |
| 2020/0294339 A1 | 9/2020 | Rao et al. |
| 2021/0058339 A1 | 2/2021 | Zhang et al. |
| 2021/0227383 A1* | 7/2021 | Alameh ................ H04W 12/63 |
| 2022/0021706 A1 | 1/2022 | Jubilee et al. |
| 2022/0046011 A1 | 2/2022 | Bronstein |
| 2022/0046415 A1* | 2/2022 | Chiang ................ H04W 4/023 |
| 2022/0255913 A1 | 8/2022 | Zacks et al. |

OTHER PUBLICATIONS

Office Action for U.S. Appl. No. 17/178,234, dated Apr. 4, 2023, David J. Zacks, "Enhanced Multi-Factor Authentication Based on Physical and Logical Proximity to Trusted Devices and Users", 8 pages.

* cited by examiner

ADJUSTING SECURITY POLICIES BASED ON ENDPOINT LOCATIONS

CROSS-REFERENCE TO RELATED APPLICATION

This application claims the priority of U.S. Provisional Application 63/147,178, which was filed on Feb. 8, 2021 and is hereby incorporated by reference herein in its entirety.

TECHNICAL FIELD

The present disclosure relates generally to adjusting a security policy associated with a device connecting to a secured resource based on the physical locations of endpoint devices exchanging data with the device. For example, the security policy may be strengthened based on determining that the device has connected to devices in one or more anomalous and/or suspicious locations.

BACKGROUND

Authentication is the process of verifying the identity of a user or device. In general, computer security systems perform authentication as a prerequisite for enabling a device to connect to a secured resource, such as a remote resource. By authenticating the user or device, the security systems can prevent an unauthorized user or device from accessing the secured resource.

Multi-factor authentication (MFA) is the process of verifying the identity of the user or device based on confirmation of at least two factors from the user or device. For example, a password entered into the device may be a first factor and a picture of a particular user associated with the device may be a second factor. Computer security systems may prevent the user or device from accessing the secured resource until the systems receive the multiple factors from the user or device. In general, an MFA scheme is more stringent than a single-factor authentication scheme and can therefore enhance the security of the protected resource.

In various examples, a security system may force the user or device to reauthenticate after expiration of a particular time period. However, users may find repeated reauthentication, particularly complex MFA processes, frustrating and inconvenient. In addition, some authentication factors associated with an MFA process are more difficult or invasive for a user to input than others. Accordingly, it may be advantageous to implement an MFA process that is repeated relatively infrequently for devices and users that are more likely to be authorized.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
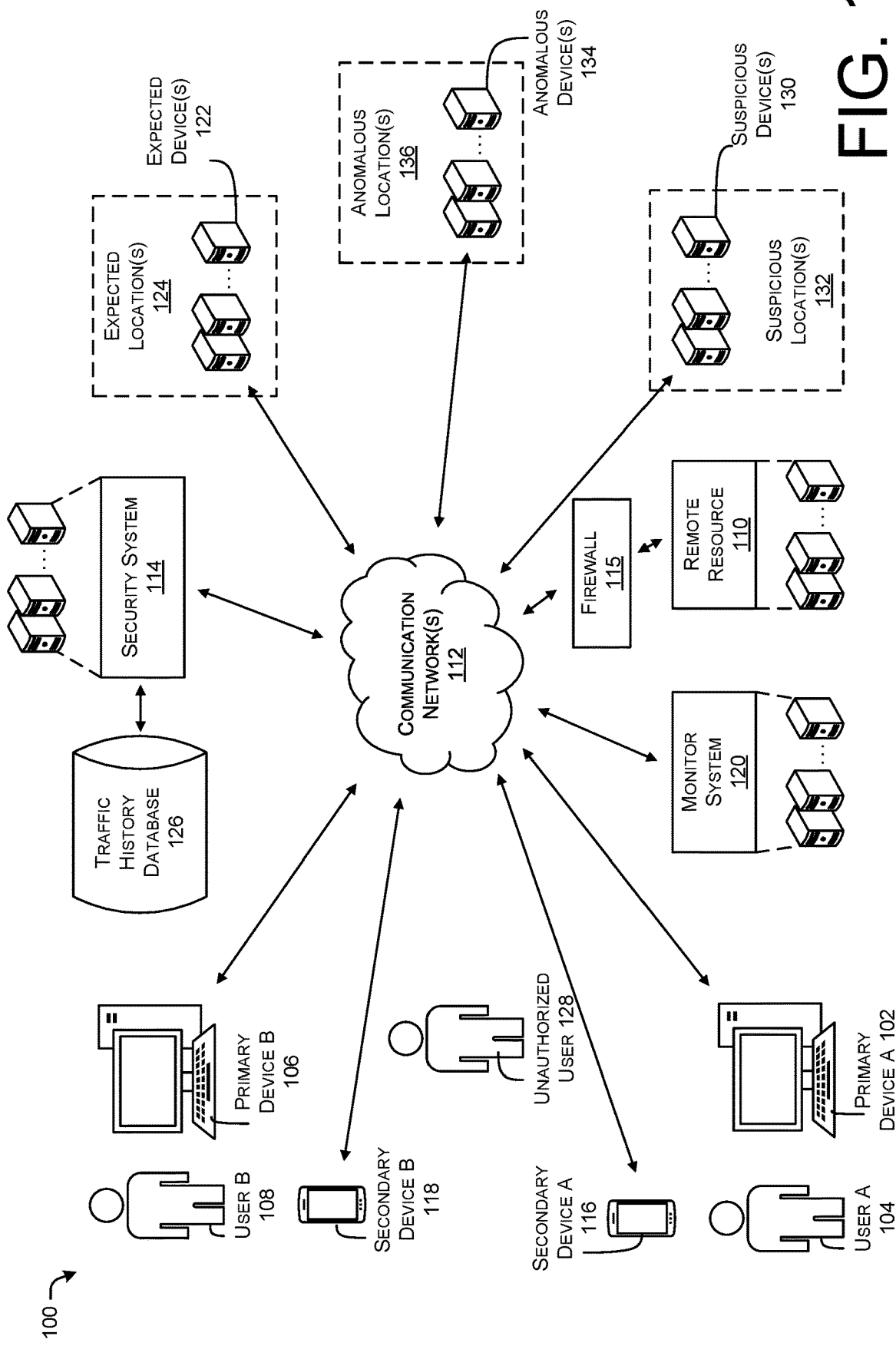
FIG. 1 illustrates an example environment for optimizing reauthentication efficacy and efficiency based on the geographical locations of connected devices.

This disclosure describes various techniques for adjusting a security policy protecting a resource from a device based on the physical locations of endpoint devices connected to the device. An example method includes performing, at a first time, a first authentication of a first device connecting to a resource; determining addresses of second devices exchanging data with the first device; determining physical locations of the second devices based on the addresses; and determining a reauthentication interval based on the physical locations of the second devices. At a second time that is after the first time by the reauthentication interval, the method further includes disconnecting the first device from the resource; and based on disconnecting the first device from the resource, triggering a second authentication of the first device.

In some examples, performing the first authentication comprises: transmitting, to the first device, a request for a first authentication factor; receiving, from the first device, the first authentication factor; transmitting, to the first device or a third device, a request for a second authentication factor, the first device and the third device being associated with the same user; and receiving, from the first device or the third device, the second authentication factor.

In some instances, determining the addresses of the second devices exchanging data with the first device comprises receiving, from a monitoring system, a message indicating the addresses of the second devices.

According to some examples, the physical locations are first physical locations, and determining the reauthentication interval based on the first physical locations of the second devices comprises: determining that the first physical locations of the second devices are anomalous with respect to second physical locations of third devices that were previously exchanging data with the first device; and based on determining that the first physical locations of the second devices are anomalous, defining the reauthentication interval to be shorter than a default interval.

In various implementations, the physical locations are first physical locations, the first device is one of multiple first devices in a group, and determining the reauthentication interval based on the first physical locations of the second devices comprises: determining that the first physical locations of the second devices are anomalous with respect to second physical locations of third devices that were previously exchanging data with the first devices; and based on determining that the first physical locations of the second devices are anomalous, defining the reauthentication interval to be shorter than a default interval.

In various examples, determining the reauthentication interval based on the first physical locations of the second devices comprises: identifying a suspicious physical location; determining that the physical locations of the second devices comprise the suspicious physical location; and based on determining that the physical locations of the second devices comprise the suspicious physical location, defining the reauthentication interval to be shorter than a default interval.

According to some instance, triggering the second authentication comprises: transmitting, to the first device or to a third device, a request for an authentication factor, the first device and the third device being associated with the same user. In some cases, the example method further includes selecting the authentication factor and/or causing a firewall to enforce a firewall rule based on the physical locations of the second devices.

EXAMPLE EMBODIMENTS

This disclosure describes various techniques for setting and adjusting a reauthentication interval for a primary device based on the physical locations of other devices (e.g., endpoint devices, remote devices, etc.) that have exchanged data with the primary device. This disclosure also describes various techniques for selecting an authentication factor for reauthenticating primary device Based on the physical locations of the other devices that have exchanged data with the primary device. In general, various techniques described herein can be used to adjust a security policy associated with a primary device based on the physical locations of the other devices.

Various implementations described herein solve specific problems in the field of computer security. One problem is the security risk posed by unauthorized users who gain control of authorized devices in order to access sensitive resources. For example, an unauthorized user may steal a computing device of an authorized user and use the computing device to access and transmit confidential data from a sensitive resource (e.g., a service, a hardware resource, a software resource, or the like) to an external device. Techniques such as reauthentication and MFA can, in some cases, prevent the unauthorized user from accessing the sensitive resource. However, if the reauthentication interval is consistent and sufficiently long, or the MFA factors used for reauthentication are sufficiently weak, the unauthorized user may have the opportunity to steal a significant amount of the confidential data before the unauthorized user is blocked from the sensitive resource.

In particular implementations of the present disclosure, a security system adjusts the security policy of a primary device based on the physical locations of one or more endpoint devices connected to the primary device. For example, the security system could identify that an endpoint device, which the unauthorized user intends to transmit the confidential data, is in a suspicious or anomalous location. In response, the security system may be configured to shorten the reauthentication interval or to even immediately trigger reauthentication. In some cases, the security system may be configured to use a relatively stringent authentication factor (e.g., facial recognition) upon identifying that the external device is in a suspicious or anomalous location. In some examples, the security system may cause a firewall protecting the sensitive resource to subject data to or from the primary device to a greater level of scrutiny. Accordingly, the security system can reduce or even eliminate unauthorized data leakage from the sensitive resource.

Another problem relates to the dissatisfying user experience of repeated reauthentication. Although relatively short reauthentication intervals can increase the security of the protected resource, the process of inputting authentication factors at a high frequency can be significantly interruptive for users. In various implementations described herein, the security system can implement a relatively long reauthentication interval for the primary device unless the secondary device(s) are located in suspicious geographical locations. Thus, the security system can protect the resource from malicious users while providing an improved user experience for authorized users.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for optimizing reauthentication efficacy and efficiency based on the geographical locations of connected devices. The environment 100 includes a primary device A 102 associated with a user A 104, as well as a primary device B 106 associated with a user B 108.

As used herein, the term "primary device," and its equivalents, can refer to a computing device configured to access a protected resource. Examples of primary devices include mobile phones, tablet computers, personal computers, laptops, smart televisions, servers, certain IoT devices, and the like. A primary device may be an endpoint in a session. As used herein, the terms "session," "flow," "data flow," "traffic flow," "packet flow," and their equivalents, can refer to multiple packets transmitted from a source to a destination. In some examples, a session may include packets that share at least one of the same ingress interface (e.g., Simple Network Management Protocol (SNMP) ifIndex), source (e.g., from the same Internet Protocol (IP) address), destination (e.g., directed to the same IP address), protocol (e.g., IP protocol), source port (e.g., for User Datagram Protocol (UDP) or Transmission Control Protocol (TCP)), destination port (e.g., for UDP, TCP, or Internet Control Message Protocol (ICMP)), or type of service (e.g., IP Type of Service (ToS)). As used herein, the term "resource," and its equivalents, can refer to a hardware resource (e.g., a processor, memory, or the like), a software resource (e.g., a virtual machine (VM)), or a combination thereof.

The example environment 100 includes a remote resource 110 that is connected to primary device A 102 and primary device B 106. In various examples, the remote resource 110 includes at least one of data, an application, a virtual machine (VM), or a program hosted on one or more computing devices. The remote resource 110 may be implemented by hardware (e.g., one or more server computers), software (e.g., instructions executed by one or more server computers), or a combination thereof. The remote resource 110, for example, may store or be otherwise capable of providing sensitive data. As used herein, the term "sensitive data," and its equivalents, may refer to any confidential data whose access is at least partially restricted. For example, an enterprise may implement a security mechanism (e.g., a firewall) that prevents unauthorized users and/or devices from accessing the sensitive data. In some examples, an enterprise may implement a security mechanism that prevents unauthorized users and/or devices from transmitting data to the remote resource 110, thereby preventing nefarious actors from exposing and/or modifying the sensitive data stored by the remote resource 110.

The remote resource 110 may be connected to primary device A 102 and primary device B 106 via one or more communication networks 112. As used herein, the term "communication network," and its equivalents, can refer to any network configured to transfer data from one endpoint to another. A communication network may include one or more fiber-optic networks, one or more wired networks, one or more wireless networks, or any combination thereof. Examples of communication networks include, for instance, BLUETOOTH networks, WI-FI networks, 3GPP radio access networks (RANs) (e.g., including an gNodeB, an eNodeB, etc.), core networks (e.g., a 3GPP core network, such as a $3^{rd}$ Generation (3G) core network, an Evolved Packet Core (EPC), or a 5G Core (5GC), etc.), an IP multimedia subsystem (IMS) network, the Internet, or the like. Various elements illustrated in FIG. 1 transmit data to one another via the communication network(s) 112.

A security system 114 may be configured to protect the remote resource 110, and the sensitive data associated with the remote resource 110, by implementing a security policy for the remote resource 110. The security system 114 may be implemented by hardware (e.g., one or more server computers), software (e.g., instructions executed by one or more server computers), or a combination thereof. As used herein, the term "security policy," and its equivalents, can refer to one or more procedures that, when implemented, prevent access to and/or modification of a protected resource. For example, the security system 114 may be configured to authenticate a primary device (e.g., primary device A 102 or primary device B 106) and/or a user (e.g., user A 104 or user B 108) of the primary device prior to enabling the primary device to receive data from and/or transmit data to the remote resource 110.

In various examples, the security system 114 may control a firewall 115 that selectively enables data to be transmitted to and/or from the remote resource 110 based on an enforcement of one or more firewall rules. The firewall 115 may be implemented by hardware (e.g., one or more server computers), software (e.g., instructions executed by one or more server computers), or a combination thereof. As used herein, the terms "firewall rules," "firewall policies," and their equivalents, may refer to conditions associated with blocking or allowing the transmission of data to and/or from a protected resource. For example, a firewall implementing a firewall rule specifying that all data transmitted from a particular IP address should be blocked may be configured to block data transmitted from the particular IP address. In some implementations, the security system 114 may control the firewall 115 by transmitting signals to the firewall (e.g., over the communication network(s) 112) that instruct the firewall 115 to perform various functions.

In some implementations, the security system 114 protects the remote resource 110 using MFA. As used herein, the terms "multi-factor authentication," "MFA," and their equivalents, can refer to a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor; based on receiving the first authentication factor, requesting a second authentication factor; and based on receiving the second authentication factor, enabling access to a protected resource (e.g., the remote resource 110). The first authentication factor and/or the second authentication factor can be received from a single device or multiple devices associated with the same user.

Authentication factors, in some cases, include codes that are known to an authorized user. As used herein, the term "code," and its equivalents, can refer to a predetermined combination of alphanumeric characters and/or pixels. A password is an example of a code that can be used as an authentication factor. Other examples of codes include usernames, personal identification numbers (PINs), employee numbers, social security numbers (SSNs), driver's license numbers, Quick Response (QR) codes, and the like.

Examples of authentication factors include evidence of possession of an object associated with an authorized user. In some examples, the object may be another device associated with the authorized user. An authentication factor may be evidence that the user attempting to use a primary device is also in possession and control of a secondary device associated with the primary device. For instance, the security system 114 may transmit a push notification to secondary device A 116 and user A 104 may confirm that primary device A 102 is authorized by confirming receipt of the push notification (e.g., by entering a code specified in the push notification into primary device A 102 or selecting a button associated with the push notification on secondary device A 116). In some implementations, authentication factors may include evidence of possession of a card, a physical key, a Universal Serial Bus (USB) drive, or the like. For example, primary device A 102 may include a scanner that is configured to scan a code or chip integrated into the card, key, or USB stick.

Certain authentication factors include evidence that a device is in a particular location associated with an authorized user. For example, an authentication factor may be evidence that a primary device is located in a building associated with a home or workplace of the authorized user. In some cases, the primary device self-reports its location to the security system 114. For example, the primary device may receive signals from multiple satellites (e.g., Global Positioning System (GPS) satellites) and determine the location of primary device based on the signals. In some examples, the security system 114 receives a signal indicative of the location of the primary device. For example, the signal may indicate that the primary device is connected to an Access Point (AP) or a Radio Access Network (RAN) associated with a particular coverage area, which may indicate that the primary device is located in the coverage area.

Some authentication factors include evidence of the presence of an authorized user. In some implementations, authentication factors may be biometric factors. As used herein, the term "biometric factor," and its equivalents, can refer to evidence of the presence of a body associated with an authorized user. For example, a biometric factor may refer to data indicative of the authorized user speaking (e.g., an audible password), data indicative of a fingerprint of the authorized user (e.g., a fingerprint scan), data indicative of an eye of the authorized user (e.g., an iris or retina scan), data indicative of a face of the user (e.g., a facial scan), and so on. The security system 114 may recognize a biometric factor by performing techniques such as voice recognition, fingerprint recognition, facial recognition, and the like.

Various authentication factors may be associated with different stringency levels. That is, because some authentication factors may be easier to steal or reproduce by unauthorized users and/or devices than others, the type of authentication factors requested may impact the certainty that a given user and/or device supplying the authentication factors is, in fact, the authorized user and/or device. Some examples of authentication factors with relatively low stringency levels include, for example, codes that can be stolen and input by unauthorized users. In some cases, evidence of the possession of an object and/or evidence that the device is in a particular location may be associated with a higher stringency than the codes, because stealing an object and/or being in a location associated with the authorized user may be more difficult than stealing a code. Biometric factors may have relatively high stringency factors that are greater than the stringency factors of codes, evidence of possession of an object, or evidence that the device is in a particular location. This is because biometric factors are relatively difficult to fake or steal.

Although requiring biometric factors and other types of authentication factors associated with high stringency levels can raise the likelihood that the security system 114 will successfully authenticate a user and/or device that is authorized, there are some disadvantages to requiring these high stringency authentication factors at every authentication. In particular, inputting high stringency authentication factors can cause a significant interruption to a user and/or device. For example, a user who is prompted to scan their retina at multiple reauthentications over the course of a workday may find the experience relatively invasive and distracting. Thus, these high stringency authentication factors may be associated with a lower user experience than some lower stringency authentication factors. Accordingly, it may be advantageous for the security system 114 to request relatively low stringency authentication factors when possible.

In various implementations, the security system 114 may reauthenticate entities connected to, or attempting to connect to, the remote resource 110. For example, the security system 114 may allow a user or device to connect to the remote resource 110 in response to authenticating the user or device a first time, disconnect the user or device from the remote resource 110 after a time interval after authenticating the user or device the first time has expired, and may only enable the user or device to reconnect to the remote resource 110 if the security system 114 is able to authenticate the user or device a second time. The time interval that starts when the user or device is authenticated the first time and the user or device is disconnected from the remote resource 110 (until the user or device is reauthenticated) may be referred to herein as a "reauthentication interval." In various cases, the security system 114 may perform multiple reauthentications of a single user or device. The reauthentication interval of the user or device may be fixed or adjusted based on various factors described in further detail below.

According to some instances, the security system 114 may store account information associated with different users authorized to access the remote resource 110. The account information, for example, is stored in a database in the security system 114. For example, the secure system 114 may store account information associated with user A 104 and account information associated with user B 108. The account information associated with user A 104 may indicate an access level of user A 104 (e.g., what sort of data user A 104 is authorized to access at the remote resource 110), one or more devices associated with user A 104 (e.g., the primary device A 102 and/or a secondary device A 116), authentication factors specific to user A 104 (e.g., codes, indicators of devices, biometric factors, and the like), and any other information that enables the security system 114 to confirm that the primary device A 102 is operated by user A 104. The account information associated with user B 108 may indicate an access level of user B 108 (e.g., what sort of data user B 108 is authorized to access at the remote resource 110), one or more devices associated with user B 108 (e.g., the primary device B 106 and/or a secondary device B 118), authentication factors specific to user B 108 (e.g., codes, indicators of devices, biometric factors, and the like), and any other information that enables the security system 114 to confirm that the primary device B 106 is operated by user B 108.

In particular examples, the security system 114 performs MFA of primary device A 102 and/or user A 104 based, at least in part, on communicating with the secondary device A 116. Similarly, the security system 114 may perform MFA of primary device B 106 and/or user B 108 based, at least in part, on communicating with the secondary device B 118. Secondary device A 116 may be associated with (e.g., an account of) user A 104 and secondary device B 118 may be associated with (e.g., an account of) user B 108. Examples of the secondary device A 116 and secondary device B 118 include mobile phones, tablet computers, personal computers, laptops, smart televisions, servers, certain IoT devices, and the like. In particular examples, the secondary device A 116 and the secondary device B 118 are mobile phones of user A 104 and user B 108, respectively.

In various cases, the security system 114 requests a first authentication factor from primary device A 102. Upon receiving the first authentication factor from primary device A 102, the security system 114 requests a second authentication factor from secondary device A 116. When the security system 114 receives the second authentication factor from the secondary device A 116, the security system 114 may enable primary device A 102 to connect to the remote resource 110. Similarly, the security system 114 may request a third authentication factor from primary device B 106. Upon receiving the third authentication factor from primary device B 102, the security system 114 may request a fourth authentication factor from secondary device B 118. Upon receiving the fourth authentication factor from secondary device B 118, the security system 114 may enable primary device B 106 to connect to the remote resource 110. Examples of the first through fourth authentication factors include, for instance, a username associated with user A 104 or user B 108, a password associated with an account of user A 104 or user B 108, a code provided to user A 104 or user B 108, an indication that user A or user B 108 possesses a particular object (e.g., an indication of a scan of a badge or card possessed by user A 104 or user B 108), a biometric factor (e.g., an indication of a fingerprint or retina scan) of user A 104 or user B 108, or any other type of authentication factor described herein.

In various implementations, the first authentication factor and/or the second authentication factor are specific to user A 104. The third authentication factor and/or the fourth authentication factor may be specific to user B 106. Thus, the security system 114 may confirm that user A 104 is using primary device A 102 and may confirm that user B 108 is using primary device B 106 via various MFA processes described herein.

The environment 100 may further include a monitor system 120 configured to intercept and/or track data traffic to or from primary device A 102 and/or primary device B 106. The monitor system 120 may be implemented by hardware (e.g., one or more server computers), software (e.g., instructions executed by one or more server computers), or a combination thereof. As used herein, the term "data traffic," and its equivalents, can refer to data transmitted between endpoints. In some examples, the data is transmitted via one or more data packets and/or one or more datagrams. In various implementations, the monitor system 120 may be configured to identify the destinations of egress traffic transmitted by primary device A 102 and/or primary device B 106. In various cases, the monitor system 120 may be configured to identify the sources of ingress traffic received by primary device A 102 and/or primary device B 106. For example, the monitor system may inspect packet headers of the ingress traffic and egress traffic and may identify addresses of the destinations of the egress traffic and the sources of the ingress traffic. As used herein, the term "address," and its equivalents, may refer to a label or code indicative of an entity that enables other entities to communicate with it over one or more communication networks. Examples of addresses include IP addresses, MAC addresses, and the like. In various examples, the address of an entity is uniquely assigned to that entity. A single entity may have at least one address. For example, the monitor system 120 may determine, based on the addresses noted in the egress traffic and/or ingress traffic, that primary device A 102 and primary device B 106 are exchanging data traffic with one or more expected devices 122. In some examples, the monitor system 120 is implemented by one or more devices (e.g., servers) connected to the communication network(s) 112. In some implementations, the monitor system 120 is a client operating on primary device A 102 and/or a client operating on primary device B 106.

In various implementations, the monitor system 120 may transmit, to the security system 114, one or more messages indicating the addresses of the destinations of the egress traffic and the sources of the ingress traffic. The security system 114 may determine, based on the addresses, the physical locations of the destinations of the egress traffic and the sources of the ingress traffic. As used herein, the terms "physical location," "geolocation," and their equivalents, can refer to a geographical position. A physical location of an entity, for example, may refer to a geographic coordinate, a street, a block, a city, a county, a postage code (e.g., a ZIP code), a state, a province, a country, a continent, a geographic region, or any combination thereof, at which the entity is positioned. In various examples the security system 114 can derive the physical locations of the destinations of the egress traffic and the sources of the ingress traffic based on the addresses of the destinations and sources by using at least one geolocation database. For example, the security system 114 may store the geolocation database(s) or may be in communication with a device storing the geolocation database(s). The geolocation database(s), for example, may store one or more hash tables including entries that are indexed by address (e.g., IP address). An entry of the geolocation database(s) may include a particular address and the physical location of the entity associated with the particular address. The geolocation database(s) may be derived from one or more regional Internet registries, such as the African Network Information Centre (AfriNIC), the American Registry for Internet Numbers (ARIN), the Asia-Pacific Network Information Centre (APNIC), the Latin American and Caribbean Internet Address Registry (LAC-NIC), the Reseaux IP Européens (RIPE) Network Coordination Centre (NCC), or any combination thereof.

Referring back to FIG. 1, the security system 114 may determine that the expected device(s) 122 are located in one or more expected location(s) 124. For instance, the security system 114 may look up an entry of the geolocation database(s) associated with the address of an expected device 122, identify the location of the expected device 122 based on the entry, and determine that the location of the expected device 122 is an expected location 124. The security system 114 may store indications of the address(es) of the expected device(s) 122 and/or indications of the expected location(s) 124 in a traffic history database 126. In some examples, the security system 114 may further store an indication of which address(es) of the expected device(s) 122 and/or which of the expected location(s) 124 correspond to devices connected to primary device A 102, as well as an indication of which address(es) of the expected device(s) 122 and/or which of the expected location(s) 124 correspond to devices connected to primary device B 106.

As long as primary device A 102 and primary device B 106 are connected to the expected device(s) 122 located in the expected location(s) 124, the security system 114 may apply a default security policy. For example, the security system 114 may apply a default reauthentication interval to primary device A 102 and/or primary device B 106. In some cases, the security system 114 may request default authentication factors for authentication of primary device A 102 and/or primary device B 106, when primary device A 102 and primary device B 106 are exchanging or have exchanged data from the expected device(s) 122 in the expected location(s) 124. In some examples, the security system 114 may cause the firewall 115 to apply one or more default firewall rules based on primary device A 102 and primary device B 106 being located in the expected location(s) 124.

However, in some examples, an unauthorized user 128 may gain control of primary device A 102 or primary device B 106. For example, the unauthorized user 128 may steal primary device A 102 or may begin using primary device A 102 while user A 104 is away from primary device A 102. In previous authentication technologies, the unauthorized user 128 could access the remote resource 110 using primary device A 102 as long as the security system 114 did not trigger reauthentication. Thus, the unauthorized user 128 could potentially leak the sensitive data from the remote resource 110 to an external device during the reauthentication interval of primary device A 102.

Furthermore, in some previous technologies, the unauthorized user 128 could cause primary device A 102 or primary device B 106 to continue transmitting sensitive data to an external device, even if the unauthorized user 128 is not in physical possession of primary device A 102 or primary device B 106. For instance, the unauthorized user 128 could install a program on primary device A 102 or primary device B 106, wherein the program could cause primary device A 102 or primary device B 106 to transmit sensitive data from the remote resource 110 to the external device.

In various implementations of the present disclosure, the risk of the sensitive data can be prevented or minimized by the security system 114. The security system 114 may infer that primary device A 102 may be used or otherwise exposed by the unauthorized user 128 based on the physical locations of one or more endpoint devices exchanging data with primary device A 102. Based on this inference, the security system 114 may adjust a security policy associated with primary device A 102 to prevent unauthorized data leakage from the remote resource 110.

In some examples, the security system 114 may determine that primary device A 102 has connected to one or more suspicious devices 130 in one or more suspicious locations 132. The monitor system 120, for example, may transmit an indication of the address(es) of the suspicious device(s) 128 to the security system 114. The security system 114 may identify the suspicious location(s) 132 based on the address(es) of the suspicious device(s) 130. In some examples, the security system 114 may determine that the suspicious location(s) 132 match one or more predetermined suspicious locations stored by the security system 114. For instance, an administrator may specify the predetermined suspicious location(s) based on geographical regions where malicious computing activities have been identified or suspected to occur.

In some implementations, the security system 114 may determine that primary device A 102 has connected to one or more anomalous devices 134 in one or more anomalous locations 136. The monitor system 120, for instance, may transmit an indication of the address(es) of the anomalous device(s) 134 to the security system 114. The security system 114 may identify the anomalous location(s) 136 based on the address(es) of the anomalous device(s) 134. In various examples, the security system 114 may determine that the anomalous location(s) 136 are anomalous by comparing the anomalous location(s) 136 to entries in the traffic history database 126. For instance, the traffic history database 126 may store the expected location(s) 124 and the security system 114 may determine that the anomalous location(s) 136 are anomalous by applying an anomaly detection model to the stored expected location(s) 124 and the anomalous location(s) 136. In some cases, the security system 114 may determine that the anomalous location(s) 136 are anomalous with respect to the expected location(s) 124 of the expected device(s) 122 that are historically connected to primary device A 102, or with respect to the expected location(s) 124 of the expected device(s) 122 that are historically connected to a group of devices including primary device A 102. For example, the security system 114 may determine that the anomalous location(s) 136 are anomalous by comparing the anomalous location(s) 136 to the expected location(s) 124 of the expected device(s) that are historically connected to primary device A 102 and to primary device B 106.

The connection of primary device A 102 to the suspicious device(s) 130 and/or the anomalous device(s) 134 may be indicative of the unauthorized user 128 utilizing the primary device 102. Thus, in response to detecting that primary device A 102 has connected to the suspicious device(s) 130 and/or to the anomalous device(s) 134, the security system 114 may increase the stringency of a security policy associated with the primary device 102. In various examples, the security system may calculate a trust score associated with primary device A 102 based on the physical locations of the devices connected to primary device A 102. As used herein, the term "trust score," and its equivalents may refer to a metric that is indicative of a likelihood that a device has not been compromised and/or the device is operated by an authorized user. A trust score may be negatively correlated (e.g., inversely proportional) to the security risk that a device poses to a secured resource (e.g., to the remote resource 110). For instance, the security system 114 may decrease the trust score associated with primary device A 102 based on determining that primary device A 102 has communicated with the suspicious device(s) 130 and/or the anomalous device(s) 134.

In some examples, the security system 114 may decrease a reauthentication interval associated with primary device A 102. For example, if the default reauthentication interval is 6 hours, the security system 114 may instead trigger reauthentication of primary device A 102 and/or the user A 104 every 4 hours, every 2 hours, every one hour, every thirty minutes, or even immediately after determining that primary device A 102 has connected to the suspicious device(s) 130 and/or to the anomalous device(s) 134. In some cases, the security system 114 may set the reauthentication interval for primary device A 102 based on the trust score of primary device A 102. For example, the security system may set the reauthentication interval to be less than a default reauthentication interval if the trust score is less than a first threshold or may set the reauthentication interval to be greater than a default reauthentication interval if the trust score is greater than a second threshold.

In some examples, the security system 114 may require one or more stringent authentication factors in response to determining that primary device A 102 has connected to the suspicious device(s) 130 and/or the anomalous device(s) 134. For example, the security system 114 may initially request one or more default authentication factors in order to initially authenticate primary device A 102 when primary device A 102 is connected to the expected device(s) 122. Examples of the default authentication factor(s) include, for instance: a password associated with user A 104, a code previously provided to user A 104, an indication of a location of primary device A 102, or the like. However, upon determining that primary device A 102 has connected to the suspicious device(s) 130 and/or the anomalous device(s) 134, the security system 114 may trigger reauthentication of primary device A 102 by requesting one or more heightened authentication factors associated with the user A 104. Examples of the heightened authentication factor(s) include, for instance: an indication of a biometric factor (e.g., a retinal scan, an iris scan, or a fingerprint) of user A 104. In some implementations, the security system 114 may select the authentication factors based on the trust score of primary device A 102. For example, the security system 114 may select a relatively stringent authentication factor (e.g., a biometric factor) if the trust score is less than a first threshold or may select a relatively user-friendly authentication factor (e.g., a password) if the trust score is greater than a second threshold.

In various examples, the security system 114 may cause the firewall 115 to apply one or more firewall rules to data traffic between primary device A 102 and the remote resource 110 based on determining that primary device A 102 has connected to the suspicious device(s) 130 and/or the anomalous device(s) 134. For example, the security system 114 may cause the firewall 115 to apply a rule that blocks a type of data traffic (e.g., sensitive data) transmitted between primary device A 102 and the remote resource 110. In some cases, the security system 114 controls the firewall 115 based on the trust score of primary device A 102. For example, the security system 114 may cause the firewall 115 to apply a new rule or strengthen an existing firewall rule based on determining that the trust score is less than a first threshold or may cause the firewall 115 to apply one or more default firewall rules based on determining that the trust score is greater than a second threshold.

A particular example will now be described with reference to FIG. 1. In this example, primary device A 102 and primary device B 106 are associated with an enterprise that employs user A 104 and user B 106. For example, user A 104 and user B 106 work in the same office building or department. During the course of each workday, user A 104 uses primary device A 102 to access data associated with the remote resource 110. For example, user A 104 may be an accountant responsible for updating confidential financial account data hosted by the remote resource 110.

The security system 114 may authenticate that user A 104 is using primary device A 102 before enabling primary device A 102 to receive data from the remote resource 110 or transmit data to the remote resource 110. For instance, primary device A 102 may transmit a request to access the remote resource 110, which may be intercepted by the security system 114. The security system 114 may transmit a request for a first authentication factor, such as an alphanumeric password associated with an account of the user A 104, to primary device A 102. The user A 104 may enter the alphanumeric password into primary device A 102, which may transmit the alphanumeric password to the security system 114. In response to receiving the alphanumeric password, the security system 114 may transmit, to the secondary device A 116, a request for a second authentication factor, such as a push notification specifying a temporary code to enter into primary device A 102. The user A 104 may enter the temporary code into primary device A 102, which may transmit the temporary code to the security system 114. Upon receiving the temporary code, the security system 114 may forward the original request to access the remote resource 110 to the remote resource 110, which may subsequently transmit data to primary device A 102 and receive data from primary device A 102. In various cases, the security system 114 may periodically reauthenticate the user A 104 and primary device A 102, such as at a reauthentication interval of 6 hours.

In addition to the remote resource 110, user A 104 may also use primary device A 102 to connect to a first set of the expected devices 122, such as web servers configured to deliver newsfeeds to primary device A 102, devices hosting cloud-based word processing applications, and the like. User B 106, similarly, may use primary device B 106 to connect to a second set of the expected devices 122, such as web servers hosting a social media application. The first set and second set of the expected devices 122 may have different IP addresses, but may be hosted in the same expected locations 124, such as locations within Canada, the United States, and Mexico.

One day, an unauthorized user 128 steals primary device A 102 shortly (e.g., one hour) after the security system 114 has authenticated primary device A 102 and the user A 104. For example, the unauthorized user 128 may be maliciously attempting to steal the confidential financial account data associated with the remote resource 110. In an attempt to steal the confidential financial account data, the unauthorized user 128 may establish a connection between primary device A 102 and an anomalous device 134, such as a server to which the unauthorized user 128 may intend to export the confidential financial account data. The anomalous device 134 may be located in an anomalous location 126, such as Australia.

The monitor system 120 may transmit an indication of the address of the anomalous device 134 to the security system 114, which may identify that the anomalous device 134 is located in Australia rather than the expected locations 124. For instance, the security system 114 may compare the Australia location to the locations within Canada, the United States, and Mexico and conclude that the anomalous device 134 is located in an anomalous location with respect to the expected location(s) 124 historically associated with the expected device(s) 122 connected to primary device A 102 and primary device B 106.

In some examples, the unauthorized user 128 may establish a connection between primary device A 102 and a suspicious device 130, such as a computing device associated with a criminal enterprise to which the unauthorized user 128 may intend to export the confidential financial account data. In this case, the suspicious device 130 may be located in a particular postal code area of Scotland, which may match a suspicious location 132 flagged by an administrator of the enterprise as being associated with the criminal enterprise or some other malicious organization.

Upon determining that primary device A 102 has connected to the anomalous device 134 and/or the suspicious device 130, the security system 114 may shorten the reauthentication interval associated with primary device A 102. For example, the security system 114 may trigger reauthentication every four hours, every two hours, every hour, or even immediately in response to determining that the primary device 102 has connected to the anomalous device 134 and/or the suspicious device 130. The unauthorized user 128 may have stolen primary device A 102 without gaining control over the secondary device A 116, and thus may be unable to successfully complete reauthentication. As a result, the security system 114 may prevent the unauthorized user 128 from exporting the confidential financial account data to the anomalous device 134 and/or the suspicious device 130 from primary device A 102.

Further, upon determining that primary device A 102 has connected to the anomalous device 134 and/or the suspicious device 130, the security system 114 may request a different authentication factor that is more difficult for the unauthorized user 128 to supply than the default authentication factors. For example, the security system 114 may request an image of the face of the user A 104 for facial recognition during reauthentication. Even if the unauthorized user 128 has access to both primary device A 102 and the secondary device A 116, the unauthorized user 128 may be unable to supply the image of the face of the user A 104. Accordingly, the security system 114 may prevent the unauthorized user 128 from exporting the confidential financial account data to the anomalous device 134 and/or the suspicious device 130 from primary device A 102.

Figure 2:
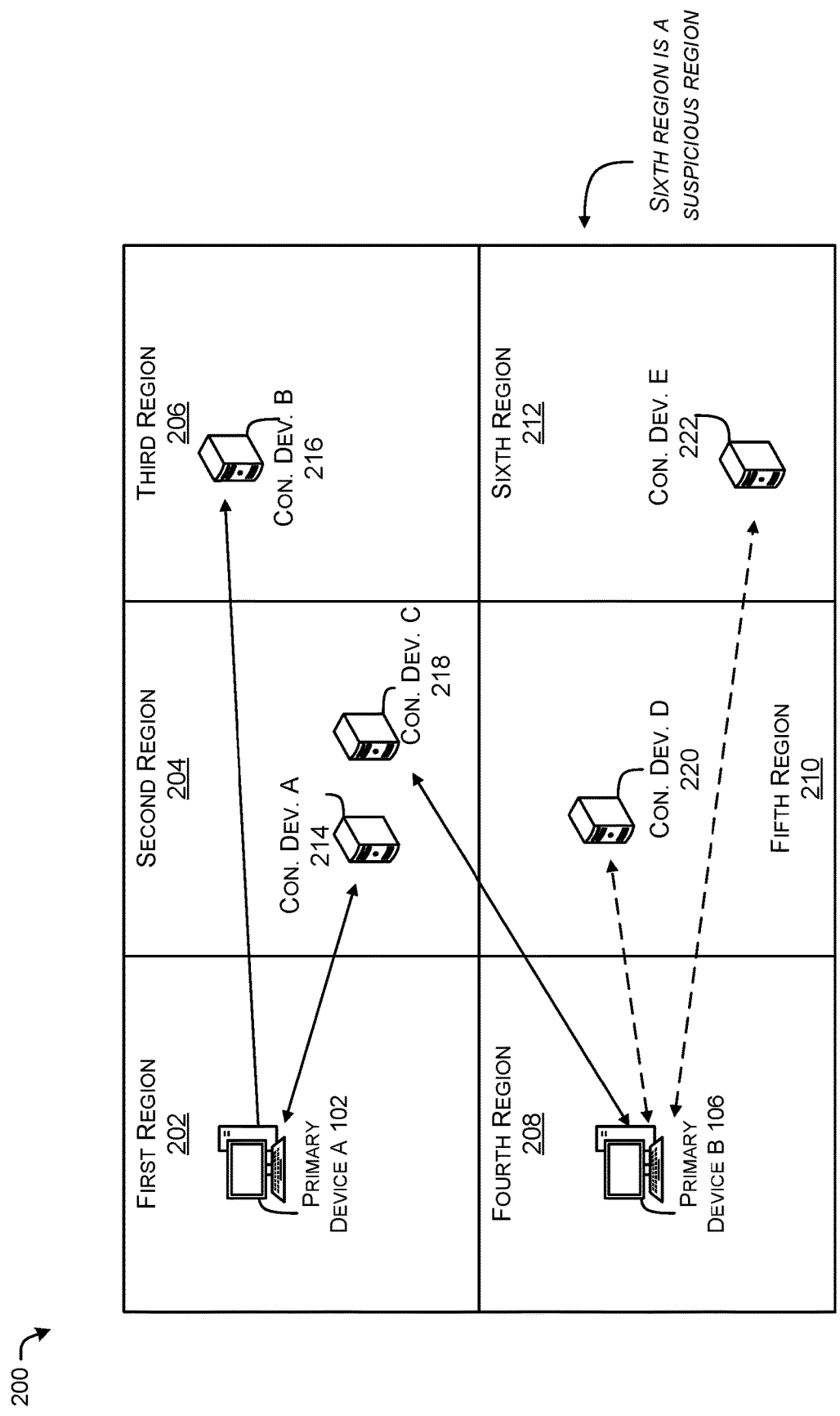
FIG. 2 illustrates an example of an environment illustrating connected devices in various geographical regions.

FIG. 2 illustrates an example of an environment 200 illustrating connected devices in various geographical regions. For example, the environment 200 includes a first region 202, a second region 204, a third region 206, a fourth region 208, a fifth region 210, and a sixth region 212. In the example of FIG. 2, primary device A 102 is located in the first region 202 and primary device B 106 is located in the fourth region 208.

In general, primary device A 102 may communicate with connected device A 214 and connected device B 216. Connected device A 214 is located in the second region 204 and connected device B 216 is located in the third region 206. Further, primary device B 106 may communicate with connected device C 218, which is also located in the second region 204. In the example environment 200 of FIG. 2, the second region 204 and the third region 206 may represent expected locations of endpoint devices connected to primary device A. The second region 204 may represent an expected location for endpoint devices connected to primary device B.

In various implementations of the present disclosure, a security policy associated with primary device B 106 may be set and/or adjusted based on the endpoint devices connected to primary device B 106. For example, a reauthentication interval associated with primary device B may be set and/or adjusted based on the physical locations of the endpoint devices connected to primary device B 106. In some cases, an authentication factor may be selected based on the physical locations of the endpoint devices connected to primary device B 106. In some cases, a firewall rule enforced for data traffic between primary device B 106 and a secured resource (e.g., the remote resource 110) is set and/or adjusted based on the physical locations of the endpoint devices connected to primary device B 106.

In some cases, the security policy associated with primary device B 106 is adjusted based on whether one or more endpoint devices that have exchanged data with primary device B 106 are present in anomalous locations. In some cases, a device is identified as being in an anomalous location if it is located in a region that is unusual or rare with respect to locations of endpoint devices that primary device B 106 has previously exchanged data with. For example, in the example of FIG. 2, if primary device B 106 has previously only exchanged data with devices in the second region 204, the fifth region 210 would be an anomalous location. Thus, a security policy associated with primary device B 106 may be adjusted based on primary device B 106 exchanging data with connected device B 220, which is located in the fifth region 210. In some examples, a device is identified as being in an anomalous location if it is located in a region that is unusual or rare with respect to endpoint devices that a group has previously exchanged data with. The group, for instance, may include both primary device A 102 and primary device B 106. In this example, the second region 204 and the third region 206 may be expected locations for endpoint devices exchanging data with the group. Thus, the fifth region 210 is also an anomalous with respect to the group, such that connected device D 220 would be considered an anomalous device. However, the third region 206 may be anomalous with respect to primary device B 106, individually, but not to the group including primary device A 102 and primary device B 106. Thus, if primary device B 106 was connected to another device in the third region 206, that device would not be considered an anomalous device with respect to the group.

In some implementations, the security policy associated with primary device B 106 is adjusted based on whether one or more endpoint devices that have exchanged data with primary device B 106 are present in suspicious locations. A suspicious location, for example, may be a predetermined location that is associated with a predetermined security risk. A security administrator, for example, may pre-specify one or more suspicious locations. In the example of FIG. 2, the sixth region 212 may be a suspicious region. A security policy associated with primary device B 106 may be adjusted based on primary device B 106 exchanging data with connected device E 222, which is located in the suspicious sixth region 212.

Various types of security policies associated with primary device B 106 may be strengthened based on the determination that the primary device 106 has exchanged data with devices in one or more anomalous and/or suspicious locations. For example, a reauthentication interval associated with primary device B may be shortened and/or set to a relatively short length based on primary device B exchanging data with the (anomalous) connected device D 220 and/or the (suspicious) connected device E 222. In some cases, a relatively high stringency authentication factor for primary device B may be selected based on primary device B exchanging data with the (anomalous) connected device D 220 and/or the (suspicious) connected device E 222. In some cases, a firewall rule enforced for data traffic between primary device B 106 and a secured resource (e.g., the remote resource 110) may be adjusted to be less permissive to data traffic associated with primary device B 106 based on primary device B exchanging data with the (anomalous) connected device D 220 and/or the (suspicious) connected device E 222.

Although FIG. 2 illustrates a relatively simple set of locations, implementations are not so limited. For example, primary device B 106 may be connected to numerous (e.g., tens, hundreds, thousands, etc., of) devices in numerous locations. An anomalous location of a connected device exchanging data with primary device B 106 can be detected using anomaly detection. For example, an anomalous location can be detected using a cluster analysis, a Hidden Markov model (HMM), a Bayesian network, a k-nearest neighbor model, or some other anomaly detection technique known in the art. In various examples, an anomalous location can be detected using an unsupervised anomaly detection technique, a supervised anomaly detection technique, or a combination thereof. An anomaly detection model used to detect the anomalous location may be trained, for example, by a training data set that represents locations of endpoint devices that have previously exchanged data with primary device B 106, the locations of endpoint devices that have previously exchanged data with a group that includes primary device B 106 (e.g., primary device A 102, other devices in the same enterprise as primary device B 106, other devices in the same office as primary device B 106, etc.), or the like. This training data may be stored in a database (e.g., the traffic history database 126). In some cases, multiple (e.g., tens, hundreds, thousands, etc., of) suspicious locations can be specified and compared to the locations of endpoint devices that have exchanged data with primary device B 106.

Figure 3:
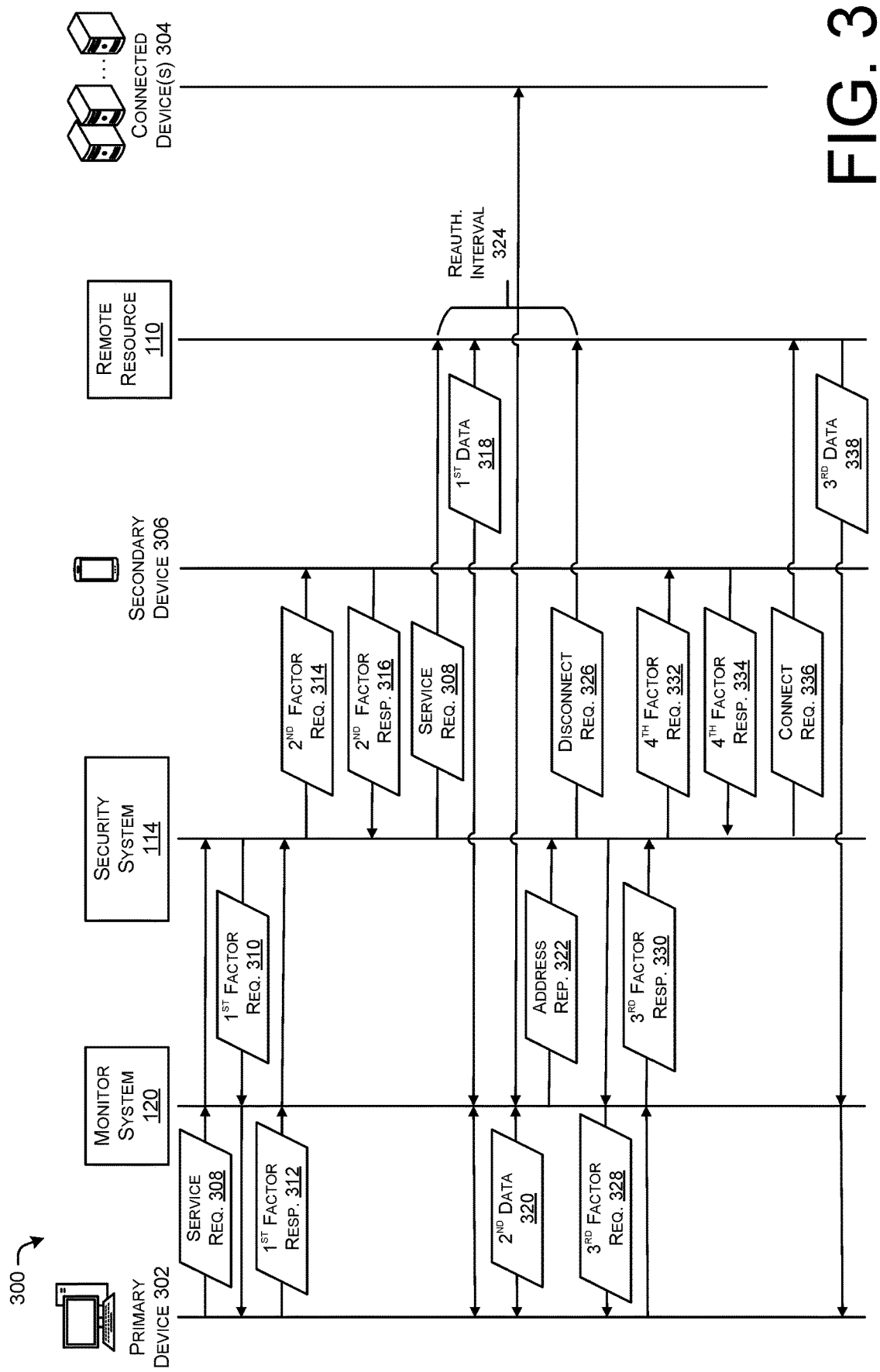
FIG. 3 illustrates example signaling for authenticating and reauthenticating a primary device based on the locations of one or more connected devices that are exchanging data with the primary device.

FIG. 3 illustrates example signaling 300 for authenticating and reauthenticating a primary device 302 based on the locations of one or more connected device(s) 304 that are exchanging data with the primary device 302. The primary device 302, for example, can be primary device A 102 or primary device B 106 described above with reference to FIG. 1. The connected device(s) 304, for example, can be the expected device(s) 122, the suspicious device(s) 130, and/or the anomalous device(s) 134 described above with reference to FIG. 1. The signaling 300 is further between the monitor system 120, the security system 114, and the remote resource 110, which are described above with reference to FIG. 1. Further, the signaling 300 involves a secondary device 306, which can be the secondary device A 116 or the secondary device B 118 described above with reference to FIG. 1. The signaling 300 described with reference to FIG. 3 may include various transmissions between entities. These messages, for example, may include data packets and/or datagrams transmitted between the entities.

The primary device 302 may transmit a service request 308, which may be intercepted by the security system 114. The monitor system 120 may intercept ingress and egress data traffic of the primary device 302, including the service request 308. The service request 308 may be a request to access the remote resource 110. For example, the service request 308 may include a request for data (e.g., sensitive data) from the remote resource 110 and/or to transmit data to the remote resource 110.

The security system 114 may refrain from forwarding the service request 308 to the remote resource 110 until the primary device 302 and/or a user of the primary device 302 is authenticated. The security system 114 may transmit a first factor request 310 to the primary device 302. The first factor request 310 may include a request for a first authentication factor. The first authentication factor, for example, may be a password or PIN.

The primary device 302 may transmit a first factor response 312 to the security system 114. In some cases, the user of the primary device 302 may input the first authentication factor into the primary device 302. For example, the primary device 302 may receive a password or code entered by the user (e.g., using a keyboard), the primary device 302 may scan the fingerprint of the user, the primary device 304 may scan a retina or iris of the user, the primary device 304 may record a voice of the user, or the like. In various implementations, the first factor response 312 includes the requested first authentication factor. For example, the user of the primary device 302 may have entered the first authentication factor into the primary device 302, the primary device 302 may have otherwise received the first authentication factor from the user, the primary device 302 may have generated the first authentication factor, or a combination thereof.

The security system 114 may transmit a second factor request 314 to the secondary device 306. The second factor request 314 may include a request for a second authentication factor. The second authentication factor, for example, may be confirmation of receiving a push notification. In various examples, the second authentication factor may be different than the first authentication factor.

The secondary device 306 may transmit a second factor response 316 to the security system 114. For example, the user of the primary device 302 may have entered the second authentication factor into the secondary device 306, the secondary device 306 may have otherwise received the second authentication factor from the user, the secondary device 306 may have generated the second authentication factor, or a combination thereof.

Upon receiving the first authentication factor and the second authentication factor, the security system 114 may authenticate the primary device 302 and/or the user of the primary device 302. The security system 114 may forward the service request 308 to the remote resource 110. Based on the service request 308, the primary device 302 may exchange first data 318 with the remote resource 110. For example, the primary device 302 may transmit data to the remote resource 110, may receive data from the remote resource 110, or both. The first data 318 includes sensitive data, in some examples.

In addition, the primary device 304 may exchange second data 320 with the connected device(s) 304. The connected device(s) 304 may be endpoints in one or more data sessions with the primary device 302. The connected device(s) 304 may be different than (e.g., separated from) the remote resource 110, the primary device 302, and the secondary device 306. The primary device 304 may transmit the second data 320 to the connected device(s) 304, receive the second data 320 from the connected device(s) 304 or a combination thereof.

The monitor system 120 may transmit an address report 322 to the security system 114. The address report 322 may indicate one or more addresses of the connected device(s) 304. For example, the monitor device 120 may determine the address(es) based on headers of data packets and/or datagrams within the second data 320. The address(es) may include one or more IP addresses of the connected device(s) 304, one or more MAC addresses of the connected device(s) 304, or a combination thereof. Based on the address report 322, the security system 114 may determine one or more physical locations of the connected device(s) 304. For example, the security system 114 may determine the physical location(s) by identifying entries corresponding to the address(es) in a geolocation database.

The security system 114 may adjust a security policy associated with the primary device 302 and/or the remote resource 110 based on the physical location(s) of the connected device(s) 304. In some examples, the security system 114 may determine whether the physical location(s) of the connected device(s) 304 includes one or more suspicious physical locations. In some implementations, the security system 114 may determine whether the physical location(s) of the connected device(s) 304 includes one or more anomalous physical locations.

Upon expiration of a reauthentication interval 324, the security system 114 may transmit a disconnect request 326 to the remote resource 110. The reauthentication interval 324 may extend between the time at which the security system 114 forwarded the service request 308 to the remote resource 110 and the time at which the security system 114 transmits the disconnect request 326 to the remote resource 110. The disconnect request 326 may include an instruction for the remote resource 110 to cease sending the first data 318 to the primary device 302 and/or receiving the first data 318 from the primary device 302. Based on receiving the disconnect request 326, the remote resource 110 may cease exchanging the first data 318 with the primary device 302.

In various examples, the security system 114 may set a length of the reauthentication interval 324 based on the physical location(s) of the connected device(s) 304. For example, the security system 114 may shorten the length of the reauthentication interval 324 if the physical location(s) include more than a first threshold number or percentage of suspicious physical locations and/or anomalous physical locations. For example, the security system 114 may immediately transmit the disconnect request 326 upon determining that the physical location(s) of the connected device(s) 304 include greater than the first threshold number or percentage of suspicious physical locations and/or anomalous physical locations. In some cases, the security system 114 may extend the length of the reauthentication interval 324 if the physical location(s) include less than a second threshold number or percentage of suspicious physical locations and/or anomalous physical locations.

The security system 114 may trigger reauthentication of the primary device 302 by transmitting a third factor request 328 to the primary device 302. The third factor request 328 may include a request for a third authentication factor. In some examples, the security system 114 selects the third authentication factor based on the physical location(s) of the connected device(s) 304. The security system 114 may select the third authentication factor to be of a higher stringency than the first authentication factor or the second authentication factor if the physical location(s) include more than the first threshold number or percentage of suspicious physical locations and/or anomalous physical locations. For instance, the security system 114 may select the third authentication factor to be a biometric factor based on determining that the physical location(s) of the connected device(s) 304 include greater than the first threshold number or percentage of suspicious physical locations and/or anomalous locations. In some cases, the security system 114 may select the third authentication factor to be the same type as the first authentication factor or the second authentication factor if the physical locations include less than the second threshold number or percentage of suspicious physical locations and/or anomalous physical locations.

The primary device 302 may transmit a third factor response 330 to the security system 114. The third factor response 330 may include the third authentication factor. For example, the user of the primary device 302 may have entered the third authentication factor into the primary device 302, the primary device 302 may have otherwise received the third authentication factor from the user, the primary device 302 may have generated the third authentication factor, or a combination thereof.

Based on receiving the third factor response 330, the security system 114 may transmit a fourth factor request 332 to the secondary device 306. The fourth factor request 332 may include a request for a fourth authentication factor. In some examples, the security system 114 selects the fourth authentication factor based on the physical location(s) of the connected device(s) 304. The security system 114 may select the fourth authentication factor to be of a higher stringency than the first authentication factor or the second authentication factor if the physical location(s) include more than the first threshold number or percentage of suspicious physical locations and/or anomalous physical locations. For instance, the security system 114 may select the fourth authentication factor to be a biometric factor based on determining that the physical location(s) of the connected device(s) 304 include greater than the first threshold number or percentage of suspicious physical locations and/or anomalous locations. In some cases, the security system 114 may select the fourth authentication factor to be the same type as the first authentication factor or the second authentication factor if the physical locations include less than the second threshold number or percentage of suspicious physical locations and/or anomalous physical locations.

The secondary device 306 may transmit a fourth factor response 334 to the security system 114. The fourth factor response 334 may include the third authentication factor. For example, the user of the primary device 302 may have entered the fourth authentication factor into the secondary device 306, the secondary device 306 may have otherwise received the fourth authentication factor from the user, the secondary device 306 may have generated the fourth authentication factor, or a combination thereof.

The security system 114 may reauthenticate the user and/or the primary device 302 based on receiving the third factor response 330 and the fourth factor response 334. Upon reauthenticating the user and/or the primary device 302, the security system 114 may transmit a connection request 336 to the remote resource 110. Upon receiving the connection request 336, the remote resource 110 may exchange third data 338 with the primary device 302. For example, the primary device 302 may transmit the third data 338 to the remote resource 110, the primary device 302 may receive the third data 338 from the remote resource 110, or a combination thereof.

Although not specifically illustrated in FIG. 3, the security system 114 can reauthenticate the primary device 302 and/or the user more than once. In some cases, the security system 114 may block the primary device 302 from exchanging data with the remote resource 110 if the remote resource 110 is unable to authenticate the primary device 302 and/or user. Further, although FIG. 3 illustrates an example in which the security system 114 requests the second authentication factor and the fourth authentication factor from the secondary device 306, and the secondary device 306 provides the second authentication factor and the fourth authentication factor to the security system 114, implementations are not so limited. For example, in some implementations, the security system 114 may transmit the second factor request 314 to the primary device 302, may receive the second factor response 316 from the primary device 302, may transmit the fourth factor request 332 to the primary device 302, may receive the fourth factor response 334 from the primary device 302, or any combination thereof.

Figure 4:
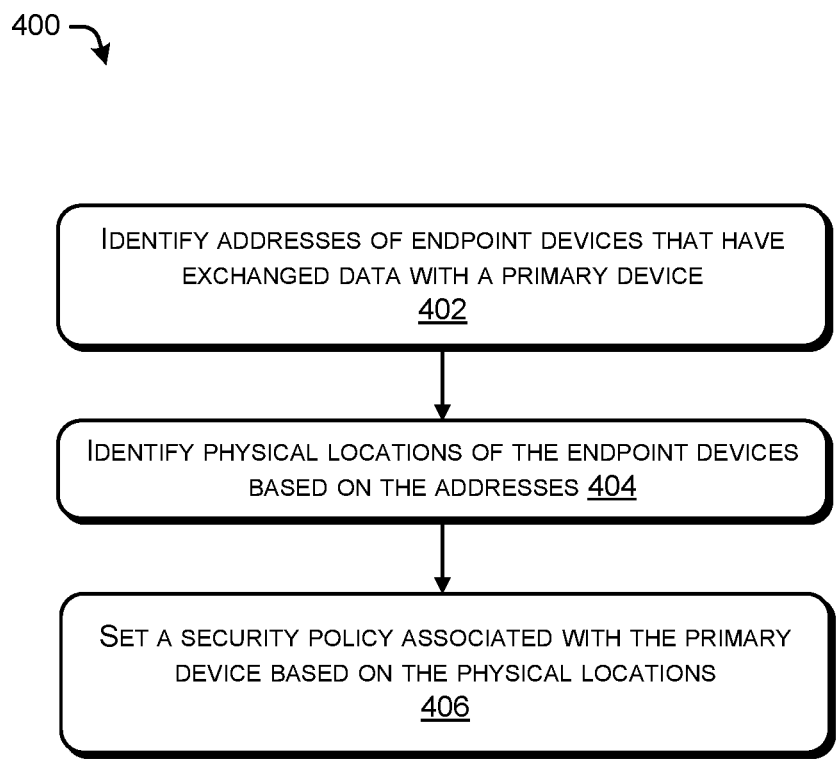
FIG. 4 illustrates an example process for setting a security policy associated with a primary device based on the locations of endpoint devices that have exchanged data with the primary device.

FIG. 4 illustrates an example process 400 for setting a security policy associated with a primary device based on the locations of endpoint devices that have exchanged data with the primary device. The process 400 may be performed by an entity, such as the security system 114 and/or the monitor system 120 described above with reference to FIG. 1.

At 402, the entity identifies addresses of endpoint devices that have exchanged data with a primary device. For example, each endpoint device may have transmitted data to the primary device and/or receiving data from the primary device. The addresses, for example, may be IP addresses, MAC addresses, or the like. In some examples, the addresses of the endpoint devices are extracted from data packets and/or datagrams exchanged between the primary device and the endpoint devices. In some examples, the primary device self-reports (e.g., transmits) the addresses of the endpoint devices to the entity.

At 404, the entity identifies physical locations of the endpoint devices based on the addresses. In some examples, the entity may access a database indexed by address and indicating physical locations associated to various addresses. The entity may look up the physical locations of the endpoint devices by accessing the entries.

At 406, the entity sets a security policy associated with primary device Based on the physical locations. That is, in some cases, the entity may implement the security policy based on the locations of the endpoint devices connected to the primary device, rather than the location of the primary device. In some cases, the entity may adjust an existing security policy associated with primary device Based on the physical locations.

In various examples, the entity may determine whether the physical locations of the endpoint devices include anomalous locations. A physical location may be anomalous if it is unusual, rare, or absent from physical locations of endpoint devices that are historically connected to the primary device and/or a group of devices (e.g., a group that includes the primary device). The endpoint devices that have historically connected to the primary device and/or the group include endpoint devices that have transmitted data to the primary device and/or group, received data from the primary device and/or group, or both. For instance, the endpoint devices that are historically connected to the primary device and/or group if they have exchanged (e.g., transmitted and/or received) data during a particular time interval that has previously occurred. The locations of endpoint devices that have historically connected to the primary device and/or the group include expected locations. In some examples, the entity may perform anomaly detection on the physical locations of the endpoint devices with respect to the expected locations of the endpoint devices that have historically connected to the primary device and/or the group.

In some implementations, the entity may determine whether the physical locations of the endpoint devices include suspicious locations. A physical location may be considered suspicious if it matches a predetermined suspicious location. For example, an administrator may indicate one or more predetermined suspicious locations to the entity in advance of the process 400 being performed. The entity may compare the physical locations of the endpoint devices to the one or more predetermined suspicious locations.

According to various implementations, the entity may set a default security policy associated with primary device Based on determining that the physical locations of the endpoint devices include less than a threshold number or percentage of anomalous and/or suspicious locations. For instance, the entity may apply a default reauthentication period by which to reauthenticate the primary device and/or a user of the primary device for access to a secured resource (e.g., the remote resource 110). In some cases, the entity may apply default authentication factors by which to reauthenticate the primary device and/or a user of the primary device. In some examples, the entity may apply one or more default firewall rules for a firewall that inspects data transferred between the primary device and the secured resource.

In some implementations, the entity may set a heightened security policy associated with primary device Based on determining that the physical locations of the endpoint devices include greater than or equal to the threshold number or percentage of anomalous and/or suspicious locations. For instance, the entity may apply a shorter reauthentication period than the default reauthentication period. In some cases, the entity may apply one or more heightened authentication factors by which to reauthenticate the primary device and/or a user of the primary device. In some examples, the entity may cause the firewall to apply one or more firewall rules that are stricter than the default firewall rule(s). In various examples, the entity may lower a trust score associated with primary device Based on determining that the physical locations of the endpoint devices include greater than or equal to the threshold number or percentage of anomalous and/or suspicious locations.

Figure 5:
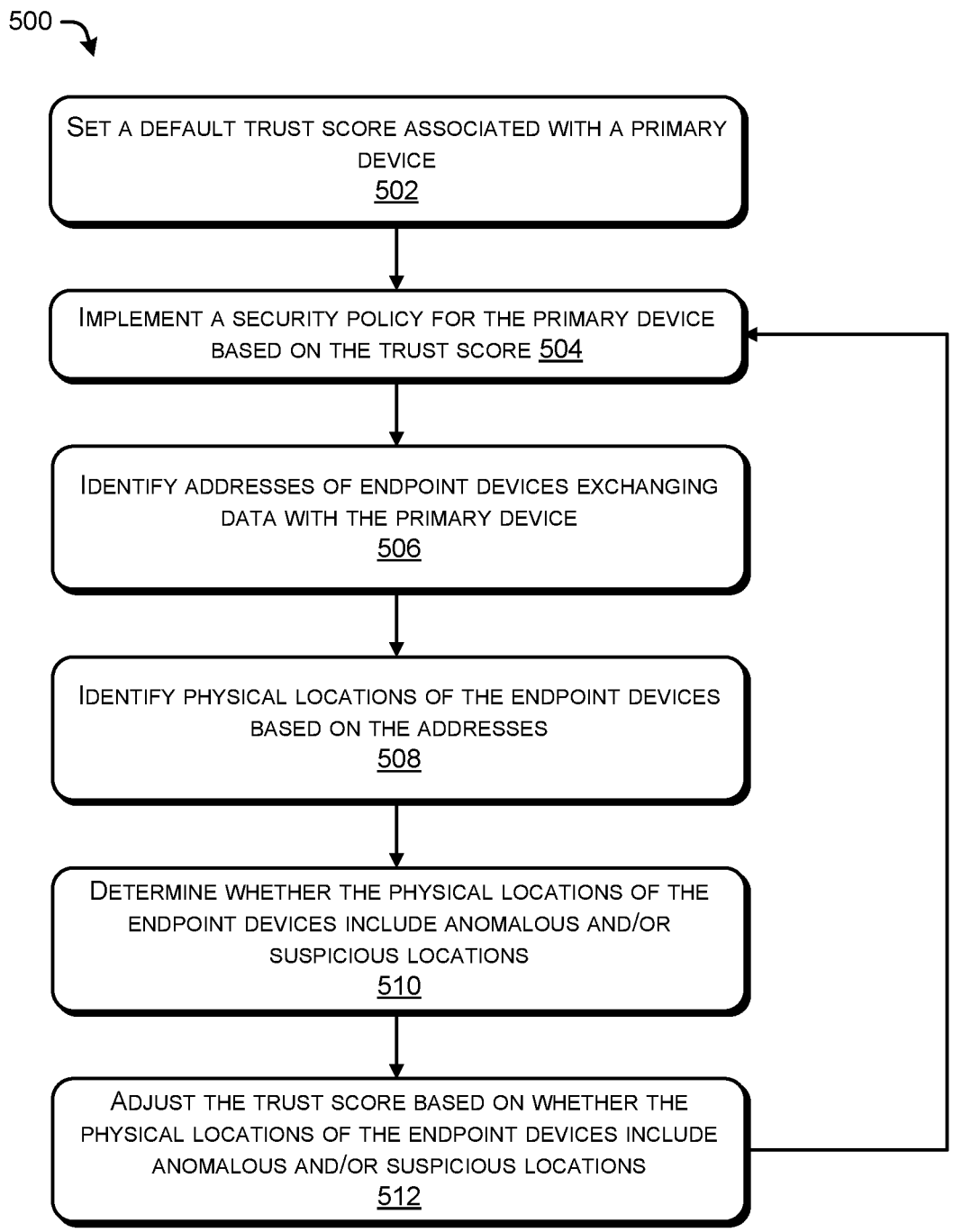
FIG. 5 illustrates an example of adjusting a security policy of a primary device based on whether endpoint devices connected to the primary device are located in anomalous and/or suspicious locations.

FIG. 5 illustrates an example of adjusting a security policy of a primary device based on whether endpoint devices connected to the primary device are located in anomalous and/or suspicious locations. The process 500 may be performed by an entity, such as the security system 114 and/or the monitor system 120 described above with reference to FIG. 1.

At 502, the entity may set a default trust score associated with a primary device (e.g., primary device A 102 or primary device B 106). The trust score may be a metric associated with how well the primary device is to be trusted. For example, the trust score may be based on how likely the primary device is operated by an authorized user and/or how unlikely the primary device is operated by an unauthorized user. In some cases, the trust score may represent the risk of exposure of a secured resource (e.g., the remote resource 110) by the primary device. In various examples, the trust score may represent the security risk to the secured resource by the primary device. In some implementations, the trust score is positively correlated with how well the primary device is to be trusted and negatively correlated with the security risk posed by the primary device to the secured resource.

At 504, the entity may implement a security policy for primary device Based on the trust score. In some examples, the security policy relates to protecting the secured resource from leakage of sensitive data from the secured resource and/or from malicious data to the secured resource. For instance, the security policy may relate to authentication and/or reauthentication of the secured resource. In various cases, the entity may set a reauthentication interval and/or a type of authentication factor for authenticating the primary device as a condition for primary device Accessing the secured resource. In some examples, the entity may set one or more firewall rules of a firewall protecting the secured resource, wherein the firewall rule(s) may govern whether the firewall blocks data traffic transmitted between the primary device and the secured resource. In various cases, the stringency of the security policy may be negatively correlated with the trust score of the primary device. For example, if the trust score is less than or equal to a threshold score, the entity may implement a relatively short reauthentication interval, a relatively stringent authentication factor, a relatively stringent firewall rule, or any combination thereof. In some instances, if the trust score is greater than the threshold score, the entity may implement a relatively long reauthentication interval, a relatively permissive authentication factor, a relatively permissive firewall rule, or any combination thereof.

At 506, the entity may identify addresses of endpoint devices exchanging data with the primary device. In some examples, the entity may receive one or more signals from the primary device indicating the addresses. In some cases, the entity may receive one or more signals indicating the addresses from a monitor system (e.g., the monitor system 120). The addresses, for instance, may include IP addresses, MAC addresses, or a combination thereof. The endpoint devices may include devices that are transmitting data to the primary device, devices that are receiving data from the primary device, or a combination thereof. The endpoint devices, in various examples, may be endpoints in sessions with the primary device.

At 508, the entity may identify physical locations of the endpoint devices based on the addresses. In some examples, the entity may access a database indexed by address and indicating physical locations associated to various addresses. The entity may look up the physical locations of the endpoint devices by accessing the entries.

At 510, the entity may determine whether the physical locations of the endpoint devices include anomalous and/or suspicious locations. In various examples, the entity may determine whether the physical locations of the endpoint devices include anomalous locations. A physical location may be anomalous if it is unusual, rare, or absent from physical locations of endpoint devices that are historically connected to the primary device and/or a group of devices (e.g., a group that includes the primary device). The endpoint devices that have historically connected to the primary device and/or the group include endpoint devices that have transmitted data to the primary device and/or group, received data from the primary device and/or group, or both. For instance, the endpoint devices that are historically connected to the primary device and/or group if they have exchanged (e.g., transmitted and/or received) data during a particular time interval that has previously occurred. The locations of endpoint devices that have historically connected to the primary device and/or the group include expected locations. In some examples, the entity may perform anomaly detection on the physical locations of the endpoint devices with respect to the expected locations of the endpoint devices that have historically connected to the primary device and/or the group.

A physical location may be considered suspicious if it matches a predetermined suspicious location. For example, an administrator may indicate one or more predetermined suspicious locations to the entity in advance of the process 400 being performed. The entity may compare the physical locations of the endpoint devices to the one or more predetermined suspicious locations.

At 512, the entity may adjust the trust score based on whether the physical locations of the endpoint devices include anomalous and/or suspicious locations. In some examples, the entity may lower the trust score if the physical locations include greater than a threshold number and/or percentage of anomalous and/or suspicious locations. According to some implementations, the entity may decrease the trust score by an amount proportional to the number and/or percentage of anomalous and/or suspicious locations among the physical locations of the endpoint devices. In some implementations, the entity may increase the trust score if the physical locations include less than or equal to the threshold number and/or percentage of anomalous and/or suspicious locations.

After 512, the process 500 may return to 504. In various implementations, the entity may adjust the security policy and/or trust score based on the physical locations of endpoint devices connected to the primary device. In some examples, the entity may perform the process 500 periodically. For example, the entity may adjust the trust score at 512 and/or implement the security policy at 504 at a particular frequency (e.g., once an hour, once every twelve hours, once a day, or the like). In some examples, the entity may perform 512 and/or 504 in response to events. For instance, the entity may automatically adjust the security policy for the primary device in response to the physical locations including greater than a threshold number or percentage of anomalous and/or suspicious locations and/or the trust score changing greater than a threshold amount.

Figure 6:
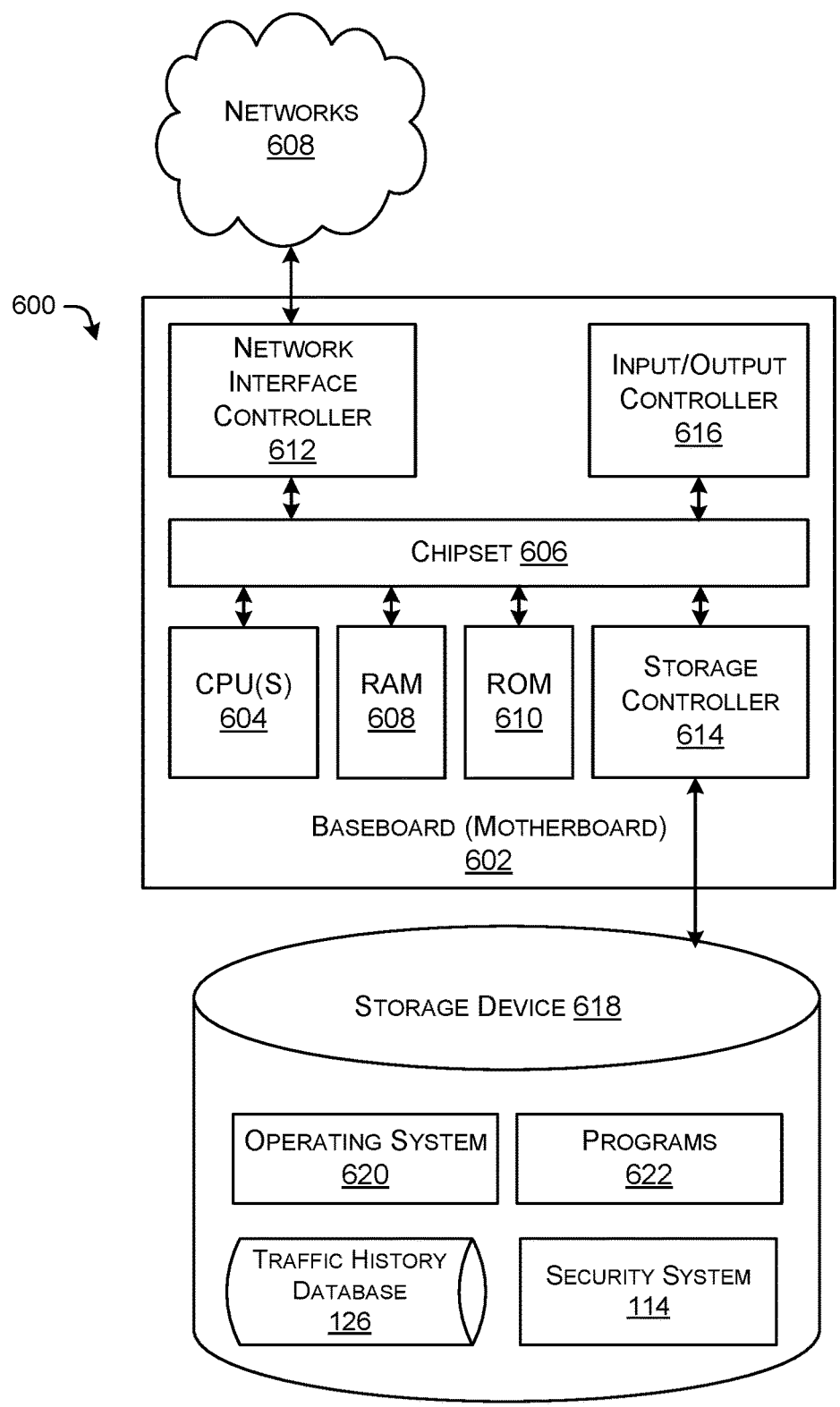
FIG. 6 shows an example computer architecture for a server computer capable of executing program components for implementing the functionality described herein.

FIG. 6 shows an example computer architecture for a server computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a random-access memory (RAM) 608, used as the main memory in the computer 600. The chipset 606 can further provide an interface to a computer-readable storage medium such as a read-only memory (ROM) 610 or non-volatile RAM (NVRAM) for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 612. The chipset 606 can include functionality for providing network connectivity through a network interface controller (NIC) 612, such as a gigabit Ethernet adapter. The NIC 612 is capable of connecting the computer 600 to other computing devices over the network 612. It should be appreciated that multiple NICs 612 can be present in the computer 600, connecting the computer 600 to other types of networks and remote computer systems. In some instances, the NICs 612 may include at least on ingress port and/or at least one egress port.

The computer 600 can be connected to a storage device 616 that provides non-volatile storage for the computer. The storage device 616 can store an operating system 618, programs 620, and data, which have been described in greater detail herein. The storage device 616 can be connected to the computer 600 through a storage controller 616 connected to the chipset 606. The storage device 618 can consist of one or more physical storage units. The storage controller 616 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 616 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by any network node described herein may be supported by one or more devices similar to computer 600. Stated otherwise, some or all of the operations performed by a network node may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 618 utilized to control the operation of the computer 600. According to one embodiment, the operating system comprises the LINUX™ operating system. According to another embodiment, the operating system includes the WINDOWS™ SERVER operating system from MICROSOFT Corporation of Redmond, Wash. According to further embodiments, the operating system can comprise the UNIX™ operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

As illustrated in FIG. 6, the storage device 618 stores programs 622. The programs 622 may include instructions that, when executed by the CPU(s) 604, cause the computer 600 and/or the CPU(s) 604 to perform one or more operations. For example, the storage device 618 stores instructions that, when executed by the CPU(s) 604, causes the computer 600 to perform operations of the security system 114 described herein. The storage device 618 may also store other types of data, such as databases. For example, the storage device 618 may store the traffic history database 126 described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
    performing, at a first time, a first authentication of a first device connecting to a resource;
    determining addresses of second devices exchanging first data with the first device;
    determining first physical locations of the second devices based on the addresses;
    determining that at least one of the first physical locations of the second devices is anomalous with respect to second physical locations of third devices that were previously exchanging data with the first device;
    determining a reauthentication interval based on determining that at least one of the first physical locations of the second devices is anomalous with respect to second physical locations of third devices that were previously exchanging data with the first device; and
    at a second time that is after the first time by the reauthentication interval:
        disconnecting the first device from the resource; and
        based on disconnecting the first device from the resource, triggering a second authentication of the first device.

2. The method of claim 1, wherein performing the first authentication comprises:
    transmitting, to the first device, a request for a first authentication factor;
    receiving, from the first device, the first authentication factor;
    transmitting, to the first device or a fourth device, a request for a second authentication factor, the first device and the fourth device being associated with a same user; and
    receiving, from the first device or the fourth device, the second authentication factor.

3. The method of claim 1, wherein determining the addresses of the second devices exchanging first data with the first device comprises receiving, from a monitoring system, a message indicating the addresses of the second devices.

4. The method of claim 1, wherein determining the reauthentication interval comprises:
defining the reauthentication interval to be shorter than a default interval.

5. The method of claim 1, wherein the second devices comprise one or more endpoint devices.

6. The method of claim 1, wherein determining the reauthentication interval based on the first physical locations of the second devices comprises:
identifying a suspicious physical location;
determining that at least one of the first physical locations of the second devices comprises the suspicious physical location; and
based on determining that at least one of the first physical locations of the second devices comprises the suspicious physical location, defining the reauthentication interval to be shorter than a default interval.

7. The method of claim 1, wherein triggering the second authentication comprises:
transmitting, to the first device or to a fourth device, a request for an authentication factor, the first device and the fourth device being associated with a same user.

8. The method of claim 7, further comprising:
selecting the authentication factor based on the first physical locations of the second devices.

9. A system, comprising
at least one processor; and
one or more non-transitory media storing instructions that, when executed by the system, cause the system to perform operations comprising:
performing, at a first time, a first authentication of a first device connecting to a resource;
determining addresses of second devices exchanging data with the first device;
determining first physical locations of the second devices based on the addresses;
determining that at least one of the first physical locations of the second devices is anomalous with respect to second physical locations of third devices that were previously exchanging data with the first device; and
selecting an authentication factor based on determining that at least one of the first physical locations of the second devices is anomalous with respect to the second physical locations of the third devices that were previously exchanging data with the first devices; and
at a second time that is after the first time:
disconnecting the first device from the resource; and
based on disconnecting the first device from the resource, triggering a second authentication of the first device by transmitting, to the first device or to a fourth device, a request for the authentication factor.

10. The system of claim 9, the authentication factor being a first authentication factor, wherein performing the first authentication comprises:
transmitting, to the first device, a request for a second authentication factor;
receiving, from the first device, the second authentication factor;
transmitting, to the first device or the fourth device, a request for a third authentication factor; and
receiving, from the first device or the fourth device, the third authentication factor.

11. The system of claim 9, wherein determining the addresses of the second devices exchanging data with the first device comprises receiving, from a monitoring system, a message indicating the addresses of the second devices.

12. The system of claim 9, wherein the first device is one of multiple first devices associated with a security group, and
wherein selecting the authentication factor comprises:
determining whether at least one of the first physical locations of the second devices is anomalous with respect to third physical locations of fifth devices that were previously exchanging data with the first devices; and
selecting the authentication factor based on whether at least one of the first physical locations of the second devices is anomalous with respect to the third physical locations of the fifth devices that were previously exchanging data with the first devices.

13. The system of claim 9, wherein selecting the authentication factor comprises:
identifying a suspicious physical location;
determining whether at least one of the first physical locations of the second devices comprises the suspicious physical location; and
selecting the authentication factor based on whether at least one of the first physical locations of the second devices comprises the suspicious physical location.

14. The system of claim 9, wherein the operations further comprise:
determining a reauthentication interval defined between the first time and the second time based on the first physical locations of the second devices.

15. A security system, comprising:
at least one processor; and
one or more non-transitory media storing instructions that, when executed by the system, cause the security system to perform operations comprising:
performing, at a first time, a first authentication of a primary device connecting to a resource by:
transmitting, to the primary device, a request for a first authentication factor;
receiving, from the primary device, the first authentication factor;
based on receiving the first authentication factor, transmitting, to the primary device or to a secondary device, a request for a second authentication factor;
receiving, from the primary device or the secondary device, the second authentication factor; and
based on receiving the second authentication factor, connecting the primary device to the resource;
receiving, from a monitoring system, a message indicating internet protocol (IP) addresses of endpoint devices exchanging data with the primary device;
determining first physical locations of the endpoint devices based on the IP addresses;
determining that at least one of the first physical locations of the endpoint devices is anomalous with respect to second physical locations of other devices that were previously exchanging data with the primary device;
based on determining that at least one of the first physical locations of the endpoint devices is anomalous with respect to the second physical locations of other devices that were previously exchanging data with the primary device:
  determining a reauthentication interval; and
  selecting a third authentication factor; and
at a second time that is after the first time by the reauthentication interval:
  disconnecting the primary device from the resource; and
  based on disconnecting the primary device from the resource, triggering a second authentication of the primary device by transmitting, to the primary device or to the secondary device, a request for the third authentication factor.

16. The security system of claim 15, wherein determining that at least one of the first physical locations of the endpoint devices is anomalous with respect to the second physical locations of other devices that were previously exchanging data with the primary device comprises:
  determining that the first physical locations of the endpoint devices comprise greater than a threshold number or percentage of anomalous locations,
  wherein determining the reauthentication interval comprises defining the reauthentication interval to be shorter than a default reauthentication interval, and
  wherein selecting the third authentication factor comprises selecting a biometric authentication factor that is different than the first authentication factor and the second authentication factor.

17. The security system of claim 15, wherein the operations further comprise:
  selecting a firewall rule based on the first physical locations of the endpoint devices; and
  causing a firewall to enforce the firewall rule on data transmitted between the primary device and the resource.

18. The security system of claim 15, wherein the endpoint devices comprise at least one destination of a data flow, the primary device being a source of the data flow.

19. The security system of claim 15, wherein the operations further comprise:
  determining that the first physical locations of the endpoint devices comprise greater than a threshold number or percentage of suspicious locations,
  wherein determining the reauthentication interval comprises defining the reauthentication interval to be shorter than a default reauthentication interval, and
  wherein selecting the third authentication factor comprises selecting a biometric authentication factor that is different than the first authentication factor and the second authentication factor.

20. The security system of claim 19, wherein the suspicious locations are in at least one geographic region where malicious computing activities have been identified or suspected to occur.

* * * * *